July 31, 1962  F. PORSCHE ETAL  3,047,331
FRAME CONSTRUCTION FOR VEHICLES
Filed Feb. 12, 1959  2 Sheets-Sheet 1
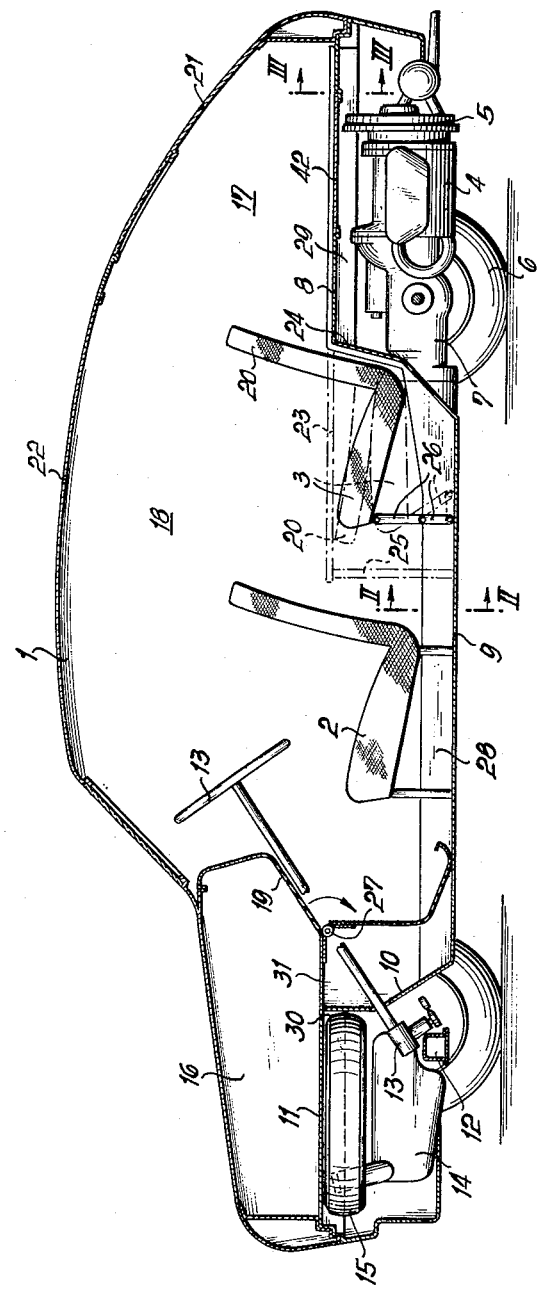
INVENTORS
FERDINAND PORSCHE
ERWIN KOMENDA
FRIEDRICH BLASCHKA
BY Dicke, Craig & Freudenberg
ATTORNEYS

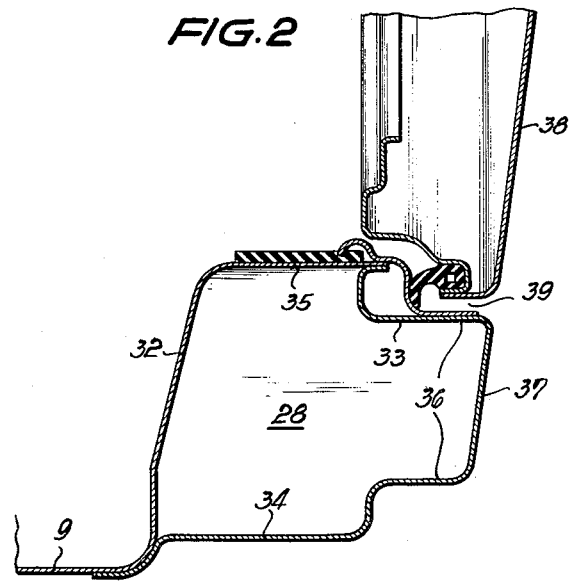
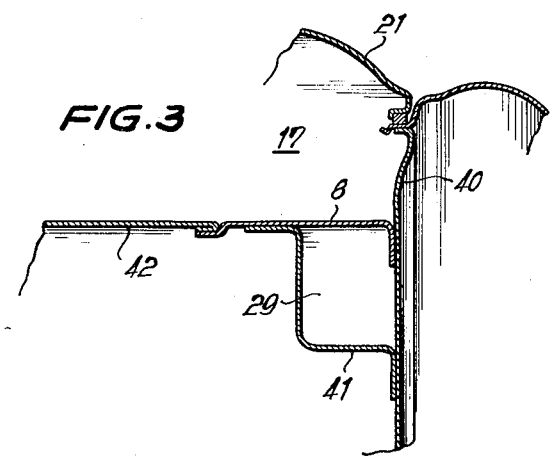

United States Patent Office 3,047,331
Patented July 31, 1962

3,047,331
FRAME CONSTRUCTION FOR VEHICLES
Ferdinand Porsche, Erwin Komenda, and Friedrich Blaschka, Stuttgart, Germany, assignors to Dr.-Ing. h.c.F. Porsche K.G., Stuttgart-Zuffenhausen, Germany
Filed Feb. 12, 1959, Ser. No. 792,841
Claims priority, application Germany Mar. 1, 1958
2 Claims. (Cl. 296—24)

The present invention relates to an undercarriage or sub-frame for self-supporting vehicle bodies of passenger motor vehicles provided with a sheet metal floor member extending over the entire width of the vehicle.

The present invention essentially consists in that the sheet metal floor member extends uninterruptedly over the length of the vehicle, preferably from the front boundary wall of the vehicle to the rear boundary wall thereof, whereby the outer parts of the sheet metal floor member which are located outside of the passenger space delimited forwardly by the fire wall and rearwardly by the rear backrest are stepped or offset upwardly with respect to the center part thereof constituting the vehicle floor and form a cover for the drive and axle units or aggregates provided within the region of the front axle and rear axle of the vehicle.

It has already been proposed in the prior art to arrange the internal combustion engine in the rear part of the vehicle below a floor plate, whereby a certain improvement of the drive characteristics of the vehicle and also an increase in the useful space thereof is achieved. The internal combustion engine was thereby so arranged below the rear seats of the vehicle in this prior art construction that the seats thereof were relatively high with respect to the relatively low center of gravity of the vehicle. Since the driving comfort for the passengers is dependent on the seating position thereof with respect to the vehicle center of gravity, the driving comfort is considerably reduced with an arrangement having relatively high seats. Furthermore, the position and location of the internal combustion engine below the seats is extremely unfavorable insofar as the accessibility thereof is concerned, whereby the transmission of noises into the passenger space as well as of the swinging movements of the seats can be prevented or minimized only with excessive uncalled for expenditures.

By the arrangement in accordance with the present invention of the drive aggregate outside of the passenger space, the seats may be secured considerably lower and more particularly directly at the vehicle floor member so that with a relatively low center of gravity of the vehicle which is obtainable with such an arrangement of the internal combustion engine, a relatively low seating position for the passengers is also available.

The drive aggregate or unit is thereby readily accessible, for example, by corresponding appropriate apertures adapted to be locked which are arranged in the closure hood or lid of the vehicle and may be readily insulated by sound-absorbing covers with respect to the luggage compartment. This is further enhanced in a far-reaching manner by the fact that the cover for the internal combustion engine which is connected with the passenger space is only very short.

In the same manner, the end part of the sheet metal floor member, provided in the front portion of the vehicle and stepped or offset upwardly with respect to the passenger space is effective to cover, in addition to the wheel-guiding members of the front axle as well as the steering mechanism thereof, also the fuel tank so that the space above the front end part of the floor sheet metal member is available as luggage compartment. Additionally, by the interposition of a front luggage compartment, the passenger space is advantageously protected or insulated against noises emanating from the front axle of the vehicle.

Furthermore, a floor plate which extends over the entire vehicle length and width thereof offers definite advantages in the manufacture and assembly of the vehicle. This is so because all sub-assemblies and aggregates may be placed thereon and secured thereto prior to the emplacement and assembly of the outer vehicle body walls whereby it offers only such rigidity, in a manner known per se, which is required for the support of such aggregates or parts.

A further considerable simplification in the manufacture is obtained in accordance with the present invention if the sheet metal floor member which extends over the entire vehicle length is constructed as a unitary stamped part made in one piece, whereby the drive aggregates, axle aggregates, and auxiliary aggregates of the vehicle are arranged exclusively below the floor sheet metal member. The outer parts of the floor sheet metal member extend horizontally through the front and rear space of the vehicle essentially at one-half the height thereof and form the floors for the luggage compartments thereof. The two outermost parts of the floor sheet metal member are preferably disposed within a common horizontal plane. The rear seats or rear seat bench of a passenger motor vehicle provided with two rows of seats disposed one behind the other is thereby so arranged and constructed that upon folding the backrest thereof against the seat cushion the rear luggage space floor may be extended, possibly by the provision of a corresponding extension plate, up to the backrest of the front seats. An additional storage space, additional to the luggage space already present in the front and rear portion of the vehicle is created thereby so that this type of vehicle may be used not only for transporting passengers but also as a very useful delivery truck.

According to another feature in accordance with the present invention, in a vehicle provided with an undercarriage or sub-frame having a dashboard secured to the floor sheet metal member of the front portion of the vehicle, the part of the dashboard located in front of the seat of the passenger or companion driver seated to the side of the driver is pivotally secured at the floor sheet metal member at the height thereof where it is normally secured thereto. As a result of such an arrangement, the front luggage space may be used for the formation of a storage surface or loading platform extending from the front to the rear of the passenger motor vehicle so that also extremely long objects may be transported with this type of vehicle.

The drive aggregate or unit for a passenger motor vehicle having a floor plate in accordance with the present invention is accommodated in the rear portion of the vehicle below the rear part of the floor sheet metal member and is constituted by an air-cooled internal combustion engine with horizontally disposed cylinders or rows of cylinders the cooling air blower of which is arranged coaxially to the crankshaft of the internal combustion engine whereby the internal combustion engine is combined with the change-speed gear as well as with the axle gear into a structural block or unit. In addition to the wheel guide members for the front axle, the spare tire as well as the fuel tank are accommodated in the front portion of the vehicle below the floor plate portion thereof.

With a sub-frame for self-supporting vehicle bodies of motor vehicles, especially for passenger motor vehicles provided with a floor extending over the entire vehicle width which is connected with a floor plate arranged in the front portion and rear portion of the vehicle for purposes of covering the various aggregates and for purposes of forming the floor of the luggage compartments and in which both parts are reinforced along the lateral longitudinal rim portions thereof by means of longitudinal bearer members, it is proposed according to a further feature of the present invention that the longitudinal bearer members be arranged within the region of the passenger space exclusively above the floor sheet-metal member whereas the longitudinal bearer members extend within the outer regions of the floor plate below the same. It is possible to achieve by such a combination a relatively low floor combined with the advantage of a further far-reaching lowering of the center of gravity, whereby, within the region of the luggage space, the latter is not reduced by the presence of bearer members or reinforcements. Additionally, the longitudinal bearer members may thereby be used directly, for example, for the support of the drive aggregate or the wheel guide members.

Accordingly, it is an object of the present invention to provide a sub-frame or undercarriage for a motor vehicle, particularly for a passenger motor vehicle which is relatively simple and sturdy in construction, relatively inexpensive in manufacture and assembly and which offers considerable operational advantages over the prior art constructions.

It is another object of the present invention to provide a floor construction for a self-supporting motor vehicle body arrangement which may be manufactured relatively inexpensively and which facilitates the preassembly of the sub-frame or undercarriage prior to emplacement thereon of the outer vehicle body walls.

A still further object of the present invention resides in the provision of a sub-frame for a self-supporting motor vehicle body construction which effectively shields the passenger space against noises, swinging movements and fumes that may come from the wheels or driving units as well as from auxiliary aggregates thereof such as the fuel tank of the motor vehicle.

Still another object of the present invention is the provision and construction of a sub-frame for a motor vehicle, particularly for a passenger motor vehicle having a self-supporting body construction in which utmost utilization of the space is made, particularly insofar as luggage compartments are concerned without sacrifice to the rigidity thereof.

A further object of the present invention resides in the arrangement and construction of a sub-frame for motor vehicles in which not only a relatively low center of gravity of the vehicle is obtainable but in which, the seats may also be arranged at a relatively low height so as to increase the driving comfort for the passengers in the vehicle.

Still another object of the present invention is the provision of a passenger motor vehicle having a relatively low center of gravity which may be readily converted to transport relatively long objects extending over the entire length of the vehicle.

These and other objects, features and advantages of the present invention will become more obvious from the following description when taken in connection with the accompanying drawing, which shows, for purposes of illustration only, one embodiment in accordance with the present invention, and wherein:

FIGURE 1 is a longitudinal cross-sectional view of a passenger motor vehicle provided with a sub-frame according to the present invention, FIGURE 2 is a cross-sectional view through the longitudinal bearer member of the sub-frame within the region of the passenger space taken along line II—II of FIGURE 1, and FIGURE 3 is a cross-sectional view through the longitudinal bearer member in the outer regions thereof taken along line III—III of FIGURE 1.

Referring now to the drawing, wherein like reference numerals are used throughout the various views to designate like parts, and more particularly to FIGURE 1 thereof, reference numeral 1 designates therein the vehicle which is a passenger motor vehicle and includes two rows of seats 2 and 3 arranged behind one another. The vehicle 1 is driven by means of an internal combustion engine 4 arranged in the rear portion of the vehicle. The internal combustion engine 4 is constructed as an opposite-piston-type engine provided with horizontally disposed air-cooled cylinders whereby the cooling blower 5 is arranged at the free end of the internal combustion engine 4. The rear wheels 6 of the passenger motor vehicle are driven from the internal combustion engine 4 over a change-speed gear accommodated within housing 7 and over a differential gear suitably connected therewith. The change-speed gear housing 7 is combined into a unitary block with the internal combustion engine 4.

The drive aggregate or unit consisting of the change-speed gear housing 7 and of the internal combustion engine 4 is covered by means of a floor plate 8 which is offset upwardly with respect to the floor member 9 of the passenger space 18 and is preferably made in one piece therewith.

The floor 9 of the passenger space extends up to the fire wall 10 which in turn is adjoined by an essentially horizontal floor plate 11 forming the cover or closure member for the front axle 12, the steering gear 13 and the fuel tank 14. The spare tire or spare wheel 15 is advantageously also arranged below the floor plate 11.

The floor plates 8 and 11 as well as the floor member 9 are preferably made as a unitary pressed or stamped part and represent the sub-frame of the motor vehicle having an essentially trough-shaped configuration in the longitudinal direction thereof. The front portion and rear portion of the vehicle are traversed by the two floor plates 8 and 11 at essentially half the height thereof and disposed in a common plane, whereby the spaces 16 and 17 disposed above the floor plates 8 and 11 serve for purposes of accommodating luggage pieces. The luggage space 16 arranged in the front portion of the vehicle is closed with respect to the passenger space 18 by means of a dashboard 19, whereby a far-reaching damping and insulation of the driving noises of the front axle is attainable. Furthermore, the penetration of gasoline vapors into the passenger space 18 from the fuel tank 14 is thereby effectively prevented or minimized.

The luggage space 17 present above the drive aggregate or unit 4, 7 in the rear portion of the vehicle is delimited with respect to the passenger space 18 by the backrest 20 of the rear seat row 3 and is accessible from the outside thereof through the hinged rear part 21 of the vehicle body 22. For purposes of increasing the loading surface of the vehicle, the rear seat row 3 is so constructed with the backrest 20 thereof that the backrest 20 upon folding against the seating cushion thereof does not extend or project above a horizontal plane which extends through the floor plate 8. As a result thereof, the floor plate 8 is adapted to be effectively extended by the backrest 20 and therewith the luggage space 17 is increased up to the forward seat row 2. However, in order to protect the backrest 20 against damages, it is advantageous to arrange an extension plate 23 above the rear seats 3 with folded-over backrest 20 which extension plate 23 is supported or secured, on the one hand, at the essentially vertically extending connecting piece 24 between the floor 9 and the floor plate 8 and, on the other, is supported at the passenger space floor 9 by means of a bracket or support 25. The rear seat 3 is thereby possibly pivotally arranged at the passenger space floor 9 within the region of the backrest 20 and the forward end of the rear seats 3 as seen in driving direction are supported by means of suitable links or supports 26 at the floor 9.

Furthermore, for purposes of extending the luggage space 16 arranged in the front portion of the vehicle, the part of the dashboard 19 disposed in front of the seat adjacent the driver's seat may be pivotally secured by means of a suitable hinge 27 at the forward floor plate 11 or at a stamped part 31 connected with the floor plate 11. As a result thereof, the entire length of the vehicle is available over a predetermined width thereof for purposes of transporting relatively long objects when the pivotal dashboard part is pivoted downwardly so as to lay open the luggage space 16 in the passenger space.

The floor member 9 as well as the adjacent floor plates 8 and 11 are provided on each side thereof with longitudinal bearer members 28, 29 and 30. The longitudinal bearer member 28 (FIGURE 2) arranged within the region of the passenger space 18 is disposed above the horizontal plane of the floor member 9. The horizontal longitudinal bearer member 28 is composed in the embodiment illustrated herein of an inner pressed or stamped part 32 and of an outer stamped or pressed part 33. The inner pressed part 32 preferably consists of one piece with the floor member or floor board 9. The outer pressed part 32 forms on the side 34 thereof facing the road the continuation of the floor 9 and, for purposes of increasing the rigidity of the longitudinal bearer member 28, is narrowed down on the outside thereof with respect to the connecting portions 34 and 35 thereof, i.e., is provided with a portion 36 having a narrower cross-section. The narrower portion 36 has an essentially U-shaped cross section as seen in FIGURE 2, whereby the web portion thereof extends in continuation of the outer contour of the vehicle body as determined by the outer body wall of the door 38. The narrower portion 36 together with the door 38 forms simultaneously the door gap 39. By arranging the longitudinal bearer member 28 above the floor 9, a corresponding low position of the vehicle center of gravity is achieved. Furthermore, with a relatively low passenger motor vehicle, the best possible height of the passenger space is obtained thereby.

The longitudinal end bearer members 29, 30 are disposed below the floor plates 8 and 9 within the end regions of the sub-frame so that the entire width of the vehicle is available thereat as luggage space and is not reduced volumetrically by any reinforcements. The longitudinal bearer member 29 (FIGURE 3) is formed within the region of the rear portion of the motor vehicle by a wall 40 of the wheel housing, by the floor plate 8 constituting the luggage space floor and by a pressed or stamped part 41. The floor plate 8 is provided with a detachable lid 42 which is arranged within the region of the internal combustion engine 4 arranged therebelow (FIGURE 1) and thereby enables ready access to the latter. The longitudinal bearer sections 28, 29 and 30 preferably form a single longitudinal bearer member extending over the entire length of the vehicle.

While we have shown and described one embodiment in accordance with the present invention, it is understood that the same is not limited thereto but is susceptible of many changes and modifications within the spirit and scope of the present invention, and we, therefore, do not wish to be limited to the details illustrated and described herein, but intend to cover all such changes and modifications as are enecompassed by the scope of the appended claims.

We claim:

1. A sub-frame for a self-supporting vehicle body of a passenger motor vehicle normally including a drive aggregate, wheel suspension means, and front and rear axle means and provided with fire wall means and with seat means including a seat for the vehicle driver and a passenger seat by the side thereof having backrest means defining a passenger space between said fire wall means and said backrest means, comprising sheet metal floor means extending essentially over the entire vehicle width and including a center portion and two end portions, said end portions extending outwardly from said passenger space in the longitudinal direction of the vehicle from said fire wall means and said backrest means and being offset upwardly with respect to said center portion of said floor means, said end portions and said center portion of said floor means extending essentially uninterruptedly over essentially the entire length of the vehicle, said end portions constituting simultaneously within the region of said front and rear axle means cover means for the drive aggregate, the wheel suspension means and auxiliary aggregates disposed therebelow, and a dashboard means secured to said sheet metal floor means at the front end of said passenger space including means for pivotally mounting the part of said dashboard means disposed in front of the passenger seat and to the side of the driver's seat of said seat means to thereby make available effectively as a loading area a space sufficient to accommodate objects which have a length almost equal to the length of the vehicle.

2. A sub-frame for a self-supporting vehicle body of a passenger motor vehicle having a drive aggregate, wheel suspension means, auxiliary aggregates, and front and rear axle means and provided with fire wall means and two rows of seats, each having a backrest, which define a passenger space therebetween, comprising sheet metal floor means essentially uninterruptedly over essentially the entire length of the vehicle and consisting of a center portion extending within said passenger space between said fire wall means and said seat means and of two end portions extending essentially horizontally outwardly from said passenger space into the longitudinal direction of said vehicle from said fire wall means and said seat means, said end portions being offset upwardly with respect to said center portion, said center portion and said two end portions extending essentially over the entire vehicle width, said two end portions of said floor means extending over said drive aggregate, wheel suspension means and auxiliary means and constituting simultaneously cover means therefor, longitudinal bearer means reinforcing said floor means along the lateral portions thereof, said longitudinal bearer means extending within the region of said passenger space exclusively above the center portion of said floor means and within the region of the end portions of said floor means below the same so as to leave substantially the full width of the vehicle as luggage space in both ends of the vehicle, dashboard means secured to said floor means, and means making available effectively as loading surface a space substantially equal to the entire length of the vehicle on one side thereof including means pivotally securing a part of said dashboard means to said floor means and means pivotally mounting the backrest of said seat rows.

References Cited in the file of this patent

UNITED STATES PATENTS

| | | |
|---|---|---|
| 2,216,120 | Ledwinka | Oct. 1, 1940 |
| 2,240,022 | Saives | Apr. 29, 1941 |
| 2,637,592 | Karlby | May 5, 1953 |
| 2,645,519 | Stanfield et al. | July 14, 1953 |
| 2,660,348 | Muller | Nov. 24, 1953 |
| 2,710,769 | Rosenthal | June 14, 1955 |
| 2,812,030 | Boehner | Nov. 5, 1957 |
| 2,841,439 | Schwenk | July 1, 1958 |
| 2,875,841 | Henderson | Mar. 3, 1959 |

FOREIGN PATENTS

| | | |
|---|---|---|
| 872,978 | France | Mar. 2, 1942 |
| 766,217 | Great Britain | Jan. 16, 1957 |